United States Patent
Woolmer et al.

(10) Patent No.: US 10,044,237 B2
(45) Date of Patent: Aug. 7, 2018

(54) POLE SHOE COOLING GAP FOR AXIAL MOTOR

(71) Applicant: YASA MOTORS LTD, Abingdon, Oxfordshire (GB)

(72) Inventors: Timothy Woolmer, Wheatley (GB); Andrew Court, Bicester (GB); Charles Edmund King, Kidlington (GB); Mark East, Hungerford (GB); Jon Barker, Oxford (GB)

(73) Assignee: Yasa Limited, Yarnton (GB)

( * ) Notice: Subject to any disclaimer, the term of this patent is extended or adjusted under 35 U.S.C. 154(b) by 15 days.

(21) Appl. No.: 14/762,016

(22) PCT Filed: Jan. 31, 2014

(86) PCT No.: PCT/GB2014/050261
§ 371 (c)(1),
(2) Date: Jul. 20, 2015

(87) PCT Pub. No.: WO2014/118554
PCT Pub. Date: Aug. 7, 2014

(65) Prior Publication Data
US 2015/0364956 A1    Dec. 17, 2015

(30) Foreign Application Priority Data
Jan. 31, 2013   (GB) .................................. 1301758.7

(51) Int. Cl.
*H02K 1/20* (2006.01)
*H02K 3/24* (2006.01)
(Continued)

(52) U.S. Cl.
CPC ................. *H02K 1/20* (2013.01); *H02K 3/24* (2013.01); *H02K 9/19* (2013.01); *H02K 9/22* (2013.01);
(Continued)

(58) Field of Classification Search
CPC .. H02K 1/20; H02K 3/24; H02K 9/22; H02K 9/19
(Continued)

(56) References Cited

U.S. PATENT DOCUMENTS 3,633,054 A   1/1972  Wiedeman et al.
6,707,221 B2  3/2004  Carl
(Continued)

FOREIGN PATENT DOCUMENTS

GB    626823 A    7/1949
GB   2468018 A    8/2010
(Continued)

OTHER PUBLICATIONS

Search Report of the GB Intellectual Property Office from Application No. GB1401722.2, dated Jul. 10, 2014.
(Continued)

*Primary Examiner* — Terrance Kenerly
(74) *Attorney, Agent, or Firm* — Meunier Carlin & Curfman LLC

(57) ABSTRACT

There is provided an axial flux motor comprising one or more rotating disks (10) and a stator (20) comprising a cavity (30) formed between walls (40a, 40b) and containing therein more than one electro-magnetic coil assembly (50). Each electro-magnetic coil assembly (50) comprises more than one pole piece (60), each having an axially extending shank portion (70a) and first and second radially extending end shoes (72a, 72b) and one or more associated coils (55), each of the one or more associated coils (55) being wound around a shank portion (70a), wherein said outer surface (75) of said end shoes are preferably joined to one or other of said walls (40a, 40b). One or both of said first or second shoes further comprise a heat exchange surface (72a1, 72b1) facing a coil (55) wound around the shank (70a) such as to define first cooling channels (100a, 100b) between one or both of said heat exchange surface (72a1, 72b1) and said coil (55), and a second flow channel (100c) defined by the spacing of said coil (55) and adjacent coils (55).

13 Claims, 5 Drawing Sheets

(51) Int. Cl.
*H02K 9/19* (2006.01)
*H02K 9/22* (2006.01)
*H02K 21/24* (2006.01)
*H02K 1/08* (2006.01)
*H02K 9/197* (2006.01)

(52) U.S. Cl.
CPC ............... *H02K 1/08* (2013.01); *H02K 9/197* (2013.01); *H02K 21/24* (2013.01)

(58) Field of Classification Search
USPC .................................................. 310/194, 54
See application file for complete search history.

(56) References Cited

U.S. PATENT DOCUMENTS

| | | | |
|---|---|---|---|
| 2003/0151326 A1 | 8/2003 | Aminul et al. | |
| 2008/0054740 A1* | 3/2008 | Kim ..................... | D06F 37/304 310/60 R |

FOREIGN PATENT DOCUMENTS

| | | |
|---|---|---|
| GB | 2482928 A | 2/2012 |
| JP | 2005304174 A | 10/2005 |
| JP | 4120558 B2 | 7/2008 |
| JP | 2009142095 A | 6/2009 |
| RU | 2025869 C1 | 12/1994 |
| RU | 2347311 C2 | 2/2009 |
| WO | 2010092403 A2 | 8/2010 |

OTHER PUBLICATIONS

International Preliminary Report on Patentability from Application No. PCT/GB2014/050261, dated Aug. 13, 2015.
International Search Report and Written Opinion of the EP International Searching Authority from International Application No. PCT/GB2014/050261 dated Feb. 20, 2015.
Search Report of the GB Intellectual Property Office from Application No. GB1301758.7 dated Jul. 11, 2013.
English Translation of the Official Notice of Rejection issued in Japanese Application No. 2015-555801, dated Nov. 21, 2017.
Office Action issued in Russian Apllication No. 2015136221, dated Sep. 18, 2017.

* cited by examiner

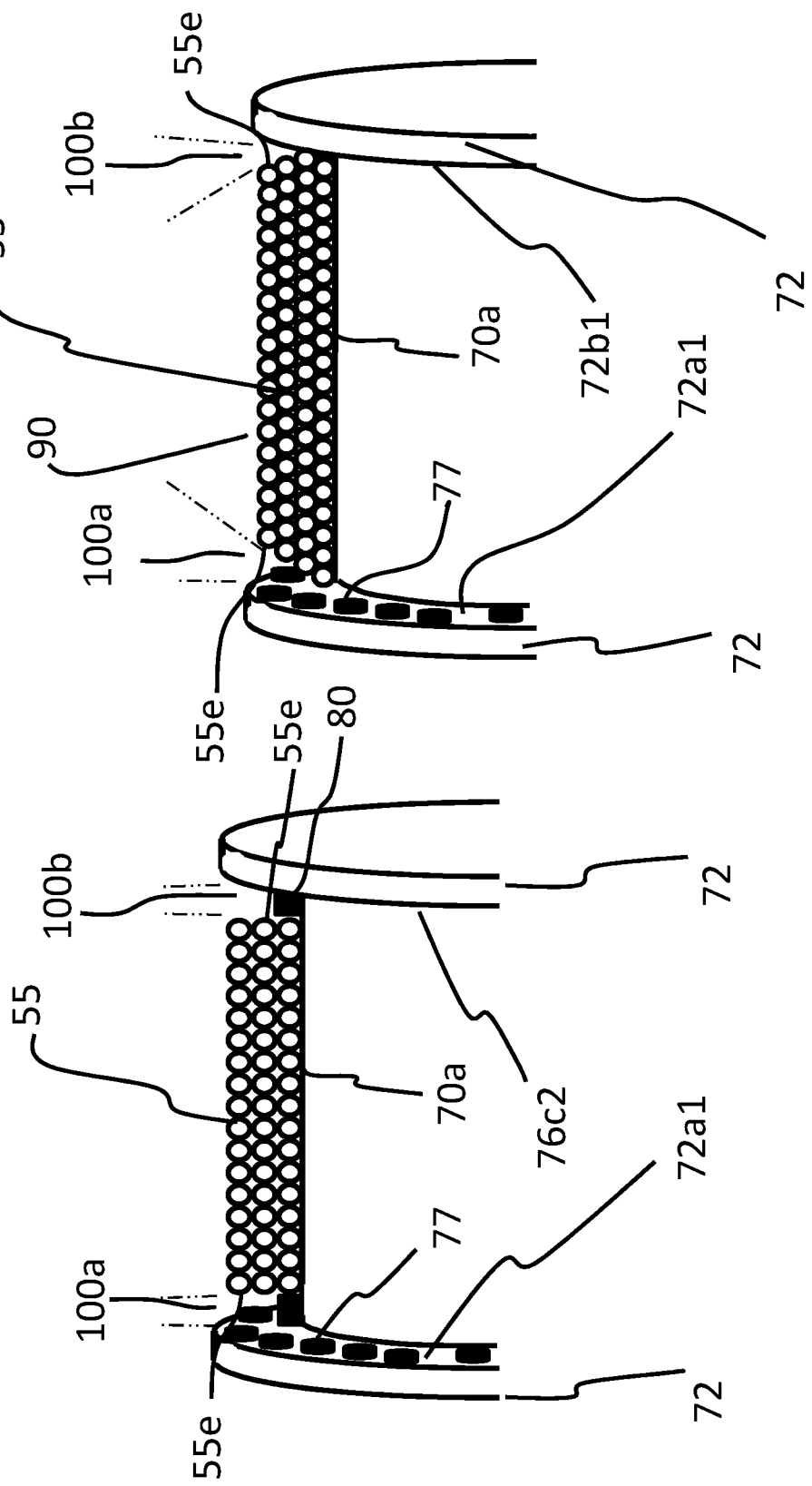

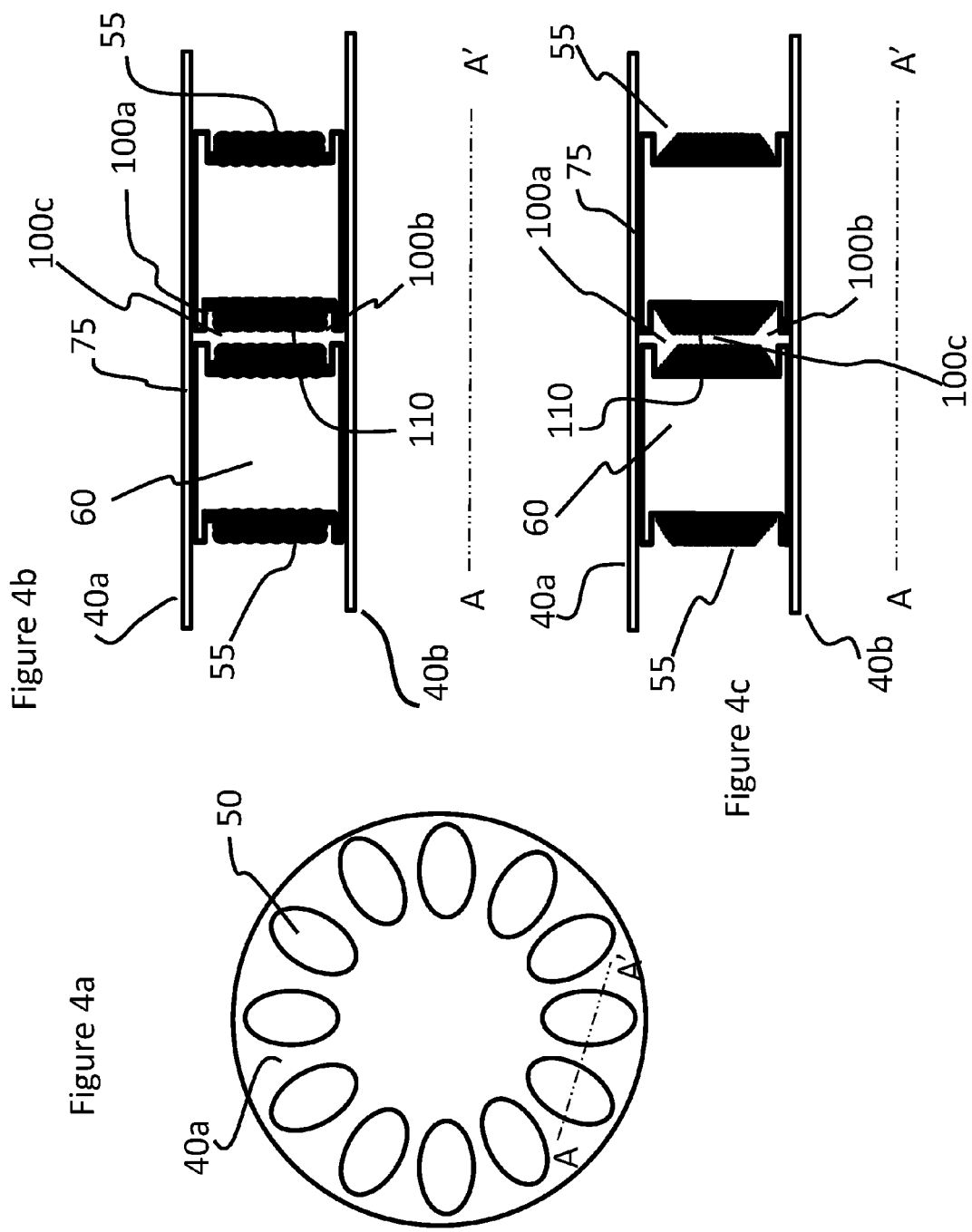

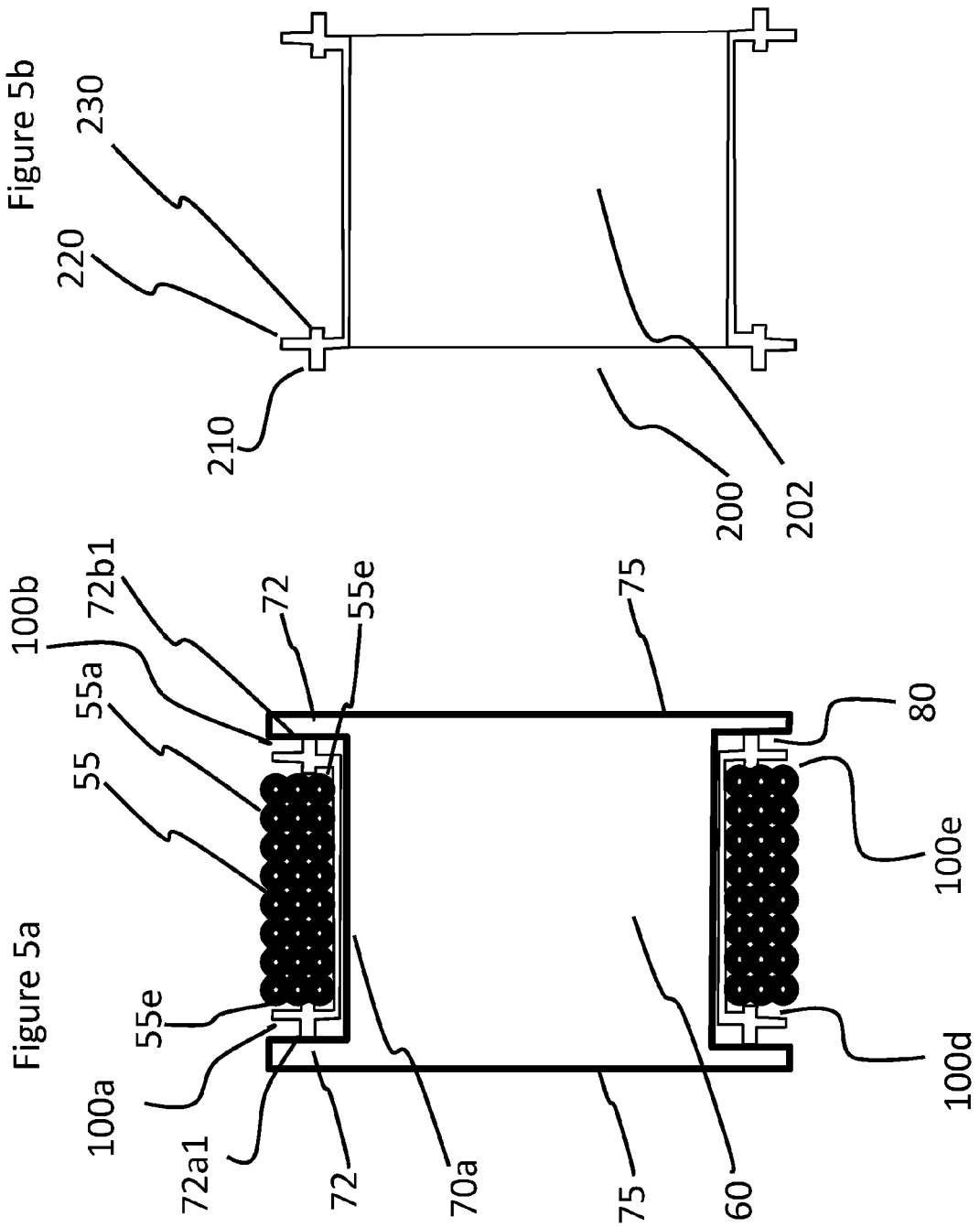

POLE SHOE COOLING GAP FOR AXIAL MOTOR

CROSS REFERENCE TO RELATED APPLICATIONS

This application is a 371 of international application no. PCT/GB2014/050261, entitled "Pole Shoe Cooling Gap for Axial Motor," filed Jan. 31, 2014, which claims priority to GB Application No. 1301758.7, filed Jan. 31, 2013, the contents of which are herein incorporated by reference in their entireties.

The present invention relates to electric machines and relates particularly but not exclusively to electric motors or generators of the kind known generally as Yokeless And Segmented Armature (YASA) motors or generators in which a stator is provided with electromagnetic coils wound on to pole pieces and the rotor is provided with permanent magnets to cooperate with the electromagnetic coils across an air gap between the rotor and stator.

An electromagnetic coil is made up of a pole shank and two pole shoes that sit at either end of the pole shank. Pole shanks hold solenoid coils and pole shoes serve two purposes, a) to confine solenoid coils onto the pole shank, i.e. wire is wound onto a pole shank and is contained thereon by pole shoes against which the wire coil abuts, and b) to spread magnetic flux from the pole shank across the air gap between the pole shank and magnets on the rotor and thereby lower magnetic reluctance across the air gap. The composite structure made up of pole shank, pole shoes and solenoid coil form an electromagnetic coil.

In GB 2468018A, Oxford YASA Motors discloses a machine comprising a series of coils wound around pole pieces spaced circumferentially around the stator and disposed axially, (i.e. parallel to the rotation axis of the rotor). The rotor has two stages comprising discs provided with permanent magnets that face either end of each electromagnetic coil of the stator.

In GB 2482928A, Oxford YASA Motors discloses an arrangement similar to that discussed above but comprising an over-moulded casing arrangement which is designed to encapsulate the magnets and coils of the arrangement within the moulded casing so as to retain pole shoes and, hence, electromagnets, the casing portions extend into a gap which would otherwise have been formed between the coils and the end faces of the stator bars on which the magnets are mounted.

In JP2009142095A, Sumitomo disclose an arrangement for cooling the stator core upon which the magnets are mounted which comprises a plurality of refrigerant grooves cut into the surface of the end faces of the stator bars. The coils themselves abut up against the surfaces of the end faces and no gap is present therebetwween. The degree of cooling provided by such an arrangement is limited as there will be little if any flow of cooling fluid through the grooves and/or the grooves are provided at limited portions around the circumference of the coils themselves.

With reference to FIG. 1 which shows a schematic diagram of an axial flux, segmented armature motor 1, an electric circuit is arranged to energize the electromagnetic coils 50 so that their polarity alternates serving to cause coils at different times to align with different magnet pairs, resulting in torque being applied between the rotor and the stator. The rotors 10 are generally connected together (for example by a shaft, not shown) and rotate together about the axis X relative to the stator 20 which is generally fixed for example in a housing 20. The arrangement illustrated in FIG. 1 shows part of a magnetic circuit provided by adjacent stator bars and magnet pairs whilst the rotor 10 is used for linking the flux between the back of each magnet 15 facing away from the respective coils. Thus, by appropriate energising of the electromagnetic coils the rotor is urged to rotate about the axis X. Of course, in the situation of a generator, rotation of the rotor induces currents in the stator coils according to the changing magnetic flux induced in the stator bars as the rotors rotate.

Electric motors are often restricted in power and torque because of temperature limitations imposed on various components. Energy is lost in coil wire through $I^2R$ losses, in pole shanks and pole shoes by eddy current and hysteresis losses. For dual rotor, axial flux, yokeless and segmented armature motors or generators, electromagnetic coils as described are mounted in a clockwise distribution held so and sandwiched by electrically insulating stator plates which plates thermally isolate coils and pole pieces from any substantial heat sink.

Energy dissipated in pole shanks and pole shoes because of eddy current losses is overcome by using soft magnetic composite as described in WO2010/092403 A2, however soft magnetic composite is still susceptible to hysteresis losses being approximately 3 times more lossy than silicon steel laminations, and these losses become significant at high rotational speeds and torque demands. It is ease of moulding pole shanks and shoes in mass production and almost zero eddy current losses that retain the viability of soft magnetic composite over silicon steel laminations, despite higher hysteresis losses.

A problem with such arrangements is therefore excessive temperature rise in pole pieces generated particularly by hysteresis and exacerbated by conducted $I^2R$ losses from motors running at high rotational speeds and torque demands. These combined loses contribute to heat generation in pole shoes and hence to their temperature rise. Magnetic efficiency requirements typically demand coils to cover the surface of pole shanks and pole shoes, and there is no opportunity to remove heat from these surfaces other than by conduction through coil wire layers. For dual rotor, axial flux, YASA motors or dynamos, pole shoe outer faces are encased in polymer or resin which is used to attach pole pieces to stator assemblies. Because there is no air cooling of outer pole shoe faces as is found for radial flux rotating coil machines, temperature of pole shoes in YASA machines can rise so as to overwhelm thermal conduction through coils to a cooling fluid, and hence attachment of pole shoes to stator plates can be thermally compromised and motors so built are power restricted to meet these thermal limitations.

Conventional methodologies focus on coil cooling as this is the major source of heat generation in dynamo electric machines. To overcome heat generation in motor coils, GB626823 describes coils of larger internal dimensions than the pole to which they are applied with the annulus gap so formed being used to allow air to pass over the inside edge of a coil, the air then passing through slotted or ducted insulating members at the coil ends. This approach provides cooling to coil wire but also reduces magnetic flux generation in poles, producing less torque and power than if coils are wound tightly on to pole shanks a feature proposed in the present invention. Insulating slotted or ducted members that support coils taught by GB626823 also prevents cooling of pole end pieces (shoes), the main object of the present invention.

GB2468018 refers to a YASA motor in which a cooling fluid is forced between stator coils, diverted so by blocking elements arranged so as to force coolant fluid to flow alternately backwards and forwards between coils thereby removing heat. Though significantly more effective than conventional techniques, this teaching is directed towards heat removal from coils, and pole shoes remain thermally isolated being covered on the one hand by resin or adhesive bonding to stator plates and on the other by wire coils. Pole shoes can therefore increase in temperature to unacceptable levels.

U.S. Pat. No. 3,633,054 is directed at cooling pole shoes and teaches an arrangement for a leg-type pole dynamo electric machine, wherein bronze rings with cooling channels are placed in direct contact with pole shoes thereby carrying away heat from the shoes. This approach is not applicable to axial flux synchronous machines because conducting rings generate eddy current losses that interfere with the working of the motor. The present invention proposes liquid coolant in direct contact with SMC pole shoe inner faces which is a significant improvement of heat removal over U.S. Pat. No. 3,633,054 that teaches an intermediary cooled metal channel. The present invention requires no additional build components so minimising cost and volume of motors and significantly improves heat removal whilst avoiding eddy current losses.

It is therefore an object of the present invention to cool pole shoes in dual rotor, axial flux, yokeless and segmented armature motors or generators by providing gaps between coils and pole shoes so that cooling liquid impinges on coil shoes and achieves improved heat transfer from pole shoes to coolant flow whilst at the same time allowing coils to be tightly wound onto pole shanks so maximising magnetic flux generation.

According to an aspect of the present invention there is provided an axial flux motor comprising: one or more rotating disks; a stator, having a cavity formed between walls and containing therein more than one electro-magnetic coil assemblies comprising more than one pole pieces each having an axially extending shank portion; first and second radially extending end shoes at ends of said one or more shank portions; and one or more coils each wound around a shank portion, wherein: said end shoes include one or more outer surfaces one or more of which are joined to one or other of said walls; one or both of said first or second shoes further comprise a heat exchange surface facing the coil such as to define one or more first cooling channels between one or both of said heat exchange surface and said coil; and the motor further includes a second flow channel defined by the spacing of the said coil and adjacent coils.

Preferably, each of said heat exchange surfaces are spaced from said coil such as to define first cooling channels between each heat exchange surface and said coil.

Preferably said coils are spaced from said one or more heat exchange surfaces by a spacer. Said spacer is preferably of a size to enable coolant access to said heat exchange surface whilst maximising motor power density. Advantageously said spacer comprises a protrusion on said shank portion or a separate ring provided around the shank portion. Alternatively said coil comprises a tapered coil having a base wider than its top and wherein said base extends along a greater length of said shank portion than said top such as to define a tapered cooling channel. More preferably said tapered coil will expose at least about 75% of said pole shoe heat exchange surface, so as to maximise coolant access and magnetic properties.

Because heat exchange is maximised by maximising surfaces in contact with turbulent coolant flow preferably said heat exchange surface includes one or more turbulence generators within the one or more cooling channels. Preferably said turbulence generators comprise detents or protrusions on one or more of said one or more heat exchange surfaces. Said detents or protrusions both increase surface area of said heat exchange surface and contribute to turbulent coolant flow.

In a particularly preferred arrangement, the machine includes a bobbin and said coil is mounted upon and around said bobbin.

Advantageously, the bobbin may include one or more spacers to space said coil from one or other or both of the heat exchange surfaces.

Preferably, the bobbin further includes one or more further spacers to space the coil from the bobbin itself and defining one or more inner cooling paths between the bobbin and the end face or faces of the coil.

Advantageously, said bobbin is electrically insulating or formed of or coated in an electrically insulating material.

Preferably, said bobbin includes an interior shaped to fit around the pole piece.

Preferably, said one or more first cooling channels are linked with the second cooling channel.

Preferably, said axial flux motor includes a liquid coolant supply means for directing liquid coolant into one or more of said one or more cooling channels such as to cool shoes associated therewith, it being advantageous if coolant flow rate generates turbulence in flow channels provided.

For axial flux segmented armature motors of the present invention wherein said segmented armatures are thermally isolated and associated pole shoes can rise in temperature so as to compromise bonding to stator plates, solutions offered by the present invention being heat removal from pole shoes thereby reducing temperature rise in said pole shoes for a given power input so enabling increased power output whilst maintaining bond integrity of pole shoes to stator plates wherein said improved heat removal is provided by enhanced heat exchange to cooling fluid achieved through defined flow paths for coolant fluid, heat exchange surface features on pole shoe internal faces to induce turbulent flow and so maximise heat transfer from pole shoe internal faces to coolant fluid.

The present invention will now be more particularly described by way of example only with reference to the accompanying drawings, in which:

FIG. 3a is a schematic diagram of a pole piece with rectangular coil showing a pole shoe inner surface with spacing element and features to generate turbulence in coolant fluid;

FIG. 3b is a schematic diagram of a pole piece with a tapered coil showing a pole shoe inner surface with spacing element and features to generate turbulence in coolant fluid;

FIG. 4a is a schematic diagram showing a distribution of pole pieces on a stator plate;

FIG. 4b is a schematic diagram of a cross section through two electromagnetic coils i.e. pole pieces with associated rectangular wire coils showing an "I" flow path for coolant;

FIG. 4c is a schematic diagram cross section through two electromagnetic tapered coils i.e. pole pieces with associated wire coils showing an "I" flow path for coolant;

FIG. 5a is a schematic cross-section through a still further arrangement incorporating a bobbin upon which the coils are wound and which may also perform the function of a spacer; and FIG. 5b is a partial cross-sectional view of the bobbin of FIG. 5a.

Figure 1:
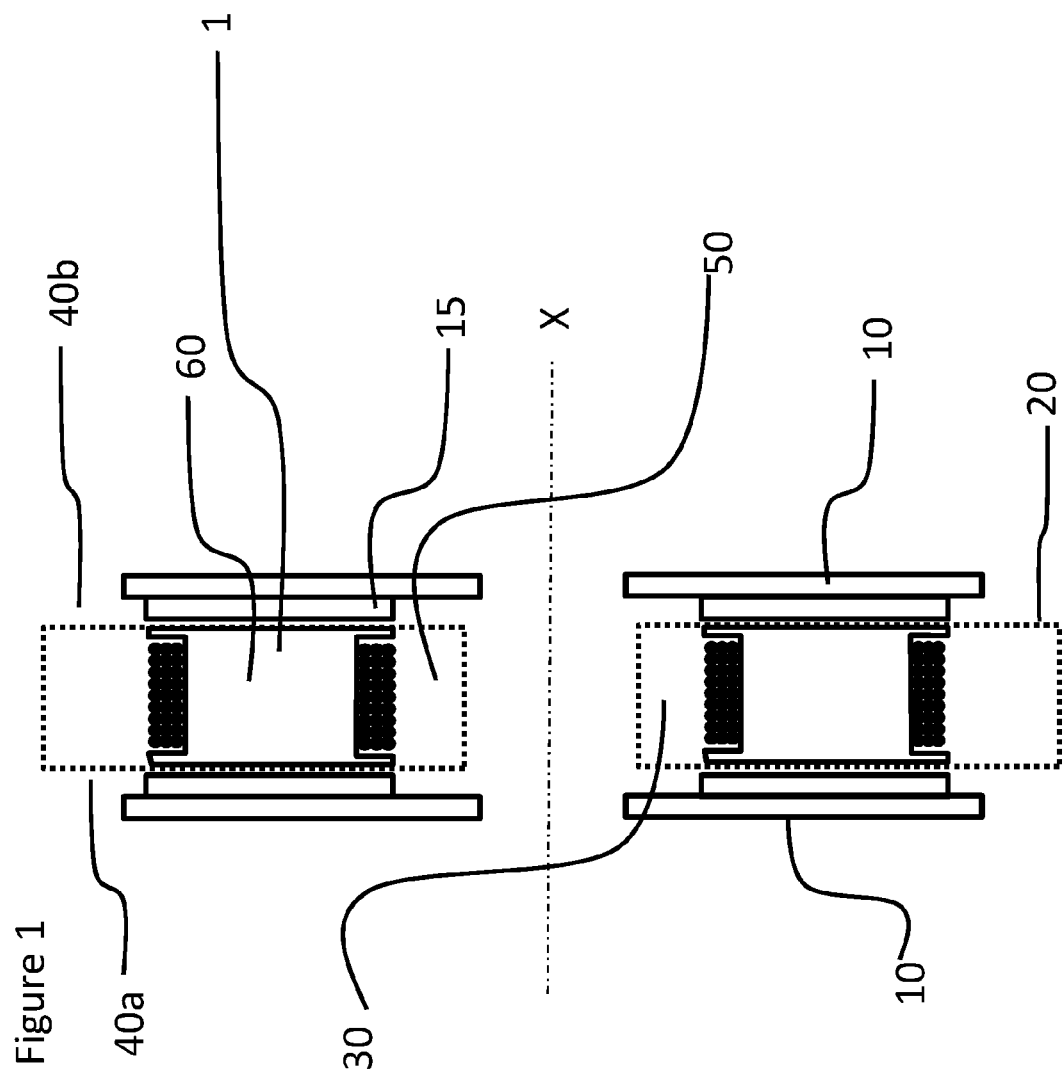
FIG. 1 is a schematic diagram of coils, stator and magnet arrangement in an axial flux motor.

Referring to FIG. 1 a stator in a double rotor, yokeless and segmented armature motor is made up of a several electromagnetic coils 50 each comprising a pole piece 60 and associated coil 55 which are distributed clockwise within a cavity 30 with cavity walls 40a and 40b, and the coils 55 are wired together and powered by an external power supply (not shown) such that a magnetic field is caused to rotate around the coils. Interacting with either end of the electromagnetic coils are several permanent magnets 15 mounted in a clockwise distribution to rotors 10. The magnets and hence rotors being urged to move from one pole position to the next by virtue of the rotating electromagnetic field, the rotor 10 turning about the axis X. The stator cavity 30 contains a liquid coolant that is caused to circulate among the electromagnetic coils thereby removing heat and passing this externally to the motor and so to a radiator (not shown). A circulation means 18 shown schematically as arrow 18 in the drawings may be provided for this purpose.

Figure 2B:
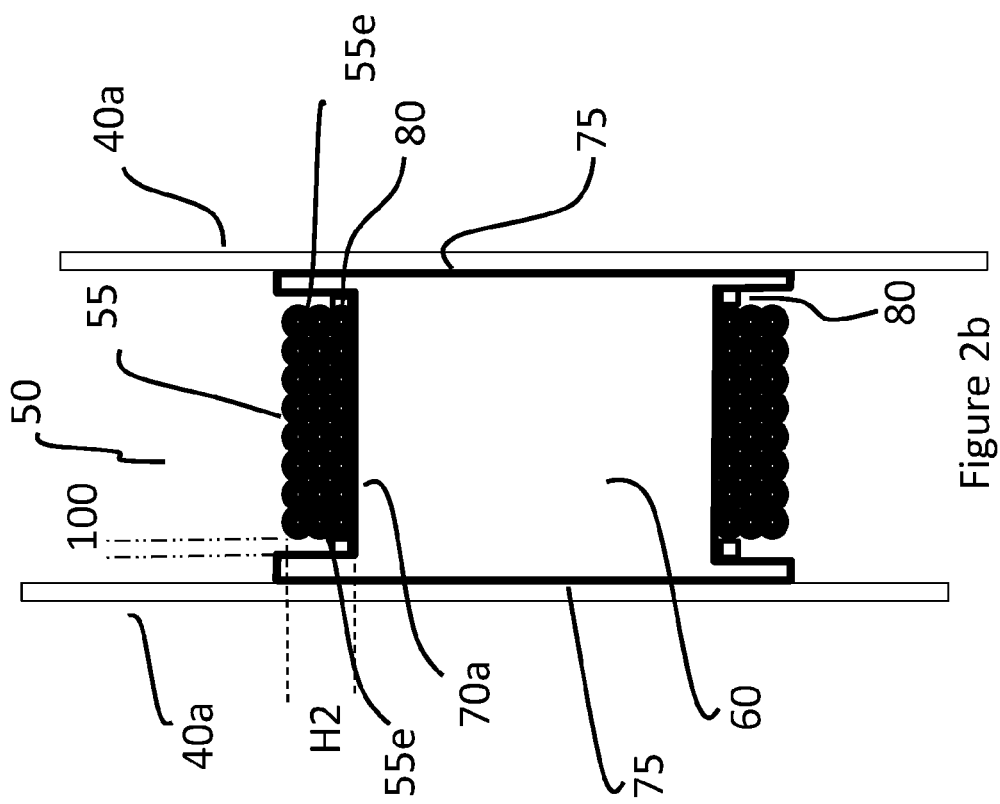
FIG. 2b is a schematic diagram of pole piece with wire coil showing gaps between pole shoes and coil ends and spacers used to initiate the gaps.
Figure 2A:
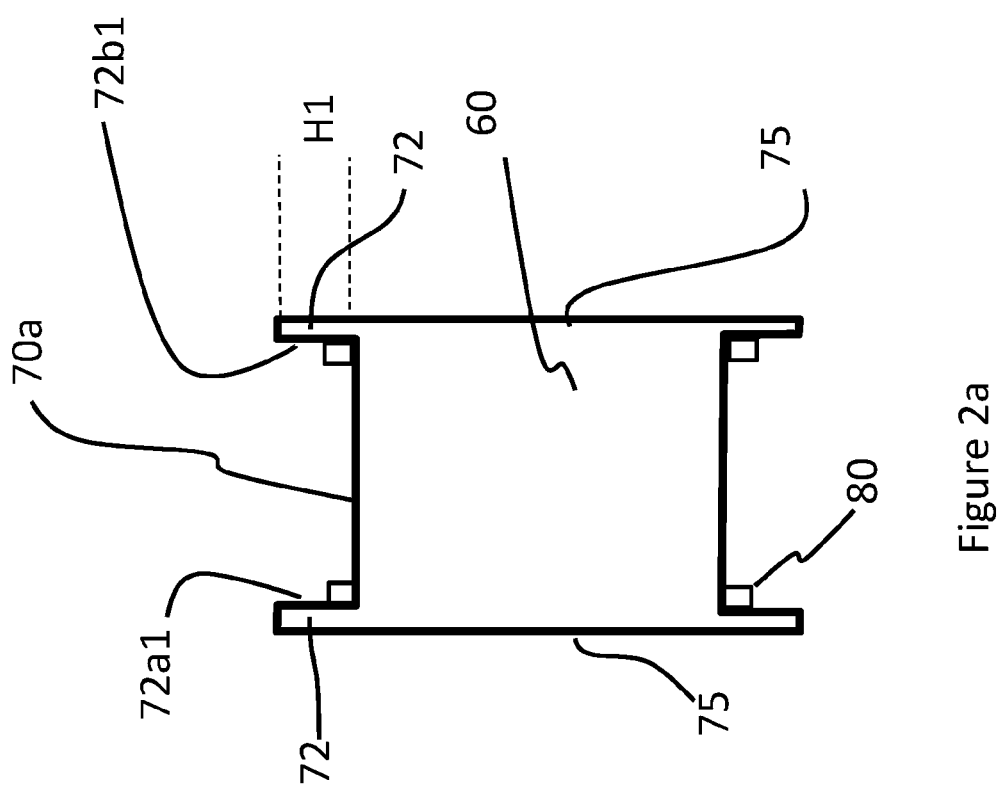
FIG. 2a is a schematic diagram of a pole piece showing pole shank and pole shoes.

FIG. 2a is a schematic diagram of a pole piece 60 which forms the core of an electromagnetic coil in motors of the present invention. The pole piece 60 being characterised by having a pole shank 70a and pole shoes 72a and 72b that sit at either end of the pole shank 70a, the height between pole shoe edge and pole shank being H1. It will be appreciated that the shoes 72 may be formed integrally or separately to the shank 70a.

Referring to FIG. 2b pole shanks 70a hold solenoid coils 55 which may be made from wire 55a of any cross-section suitable for passing sufficient current to deliver the required power, the wire 55a being wound tightly onto the pole shank 70a so there is no air gap between wire coil 55 and pole shank 70a. Wire will typically have an insulating coating (not shown) and may additionally be insulated from the pole shank. An air gap 100a, 100b is formed at either end of the coil between coil ends 55e and pole shoe inner faces 76c1, 76c2. The gap being initiated by virtue of one or more spacers 80 formed in the process of making pole shanks or they may be added prior to winding. Typically spacers 80 guide the first layer and if a second wire layer is added it follows the first thereby maintaining the air gap. Pole shoe outer faces 75 are bonded to stator plates 40a and 40b. Inner and outer circumferential walls to stator housing are not shown. The coils 50 have a height H2. For a given size motor those skilled in the art will understand there is a limit to the size of pole shoes, and consequently a limit to the pole shank height H1 and coil height H2, so as to achieve the magnetic purpose and still fit in a clockwise distribution.

FIG. 3a shows part of a pole piece with pole shoes 72a and 72b and pole shank 70a. Spacers 80 are used to initiate and maintain gaps 100a and 100b between pole shoes and a rectangular wire coil 55 wound on to pole shank 70a. To improve heat transfer protrusions or indents 77 are formed on to pole shoe inner faces 76c1 and 76c2. Such features are economically formed during manufacture of soft magnetic composite pole pieces.

FIG. 3b shows part of a pole piece with pole shoes 72a and 72b and pole shank 70a. Spacers 80 are used to initiate and maintain tapered gaps 100a and 100b between pole shoes and a tapered wire coil wound on to pole shank 70a. To improve heat transfer protrusions or indents 77 are formed on to pole shoe inner faces 76c1 and 76c2. Such features are economically formed during manufacture of soft magnetic composite pole pieces.

FIG. 4a is a schematic diagram showing a clockwise distribution of pole pieces 60 on a stator plate 40a which plate forms part of a cavity that contains a coolant fluid. An opposing stator plate, inner and outer walls (all not shown) form the remaining cavity wall components.

FIG. 4b is a cross-section A-A' (FIG. 4a) through two pole pieces 60 and their associated coils 55. Pole pieces 60 are bonded to stator plates 40a, b by a layer not shown. Two adjacent electromagnetic coils comprising pole pieces 60 and coils 55 form an "I" section fluid flow path comprising a roughly parallel wall section 110 between coils and gaps 100 between pole shoe inner surfaces and coil ends.

FIG. 4c is a cross-section A-A' through two pole pieces 60 and their associated coils 55. Pole pieces 60 are bonded to stator plates 40a, 40b by a layer not shown. Two adjacent electromagnetic coils comprising pole pieces 60 and coils 55 form an "I" section fluid flow path comprising a roughly parallel wall section 110 between coils and tapered gaps 100 between pole shoe inner surfaces and coil ends. The wall section 110 effectively provides a second or radial flow channel 100c to allow for the passage of cooling fluid between the coils 55. The gaps 100a, 100b are preferably linked for flow purposes to flow channel 100c such as to allow for the enhanced flow of coolant through the intricate passageways formed by gaps 100a and 100b and flow path 100c.

FIG. 5a, is a cross-sectional view of an alternative arrangement of spacer 80 and coil arrangement shown in proximity to the shank 70a and the inwardly facing surfaces 72a1 and 72b1. The Insulating coating (not shown) on wires 55a may be augmented by additional insulation and this may take the form of a bobbin 200 which may be formed of insulating material and which may also have spacer features 210 built in and which space the bobbin 200 from the inner surfaces 72a1 and 72b1 thereby allow cooling medium to access these surfaces in a manner similar to that discussed with reference to the prior drawings. Preferably, the bobbin 200 includes an interior portion 202 shaped to fit around the pole piece 60 such as to partially or wholly encapsulate it such an arrangement will allow the coils to be pre-assembled on the bobbin 200 before being positioned onto the pole piece and may allow the bobbin 200 to become the former around which the wires 55 are wound. Optionally the bobbin 200 may also contain further spacer features 230 to space the coil 55 from the bobbin itself and thereby also provide one or more inner cooling path(s) 100d, 100e to the coil end faces 55e. The bobbin 200 may carry the coil 55 and may in combination with the coil form a sub-assembly to be assembled onto the shank 70a during the manufacturing process. An electrically insulating feature 220 may be provided and acts to provide insulation barrier depending on voltage used. The particular advantage provided by each feature of the bobbin may be adopted individually or in combination with each other to enhance the aim of the present invention which is providing access of flowing cooling medium to the pole shoe surfaces 72a1, 72b1 and, thus improve the cooling of the overall arrangement. Spacer features 210 and 230 may be circumferential or local discrete protuberances and so provide turbulence to fluid medium passing across pole shoe and adjacent surfaces.

It will be appreciated that the above arrangement causes a significant portion of the total surface area of the heat exchange surfaces 72a1, 72b1 and the outer surface 55c of the coil to be exposed to the flow of cooling fluid being passed through the cooling channel or channels 100a, 100b.

It will also be appreciated that the heat exchange surfaces may be generally planar rather than grooved but may also be provided with discrete detents or indents shown at 77 for causing the flow of any coolant passing thereover to be disturbed and become more turbulent as such movement can further enhance the cooling effect. By spacing the coil 55 from the spacer 80 and defining a secondary cooling channel 100d, 100e it may be possible to enhance still further then overall cooling effect. It will also be appreciated that gaps or channels 100a, 100b and 100c will extend around the entire circumference of the coil 55 but at different locations and thus will cause the coil 55 and the heat exchange surfaces 72a1, 72b1 to be cooled around a greater perimeter and over a larger contact area than might otherwise be available without the spacer or than is available in the prior art arrangements. Still further, it will be appreciated that by linking one or more of the first cooling channels 100a, 100b with associated radial cooling channel 100c between the coils 55 themselves one is able to ensure that cooling fluid is more readily circulated and dead spots or no or reduced flow in the relatively restricted flow areas in channels 100a, 100b are reduced or even avoided.

The present invention provides that liquid coolant can be in direct contact with SMC pole shoe inner faces, which is a significant improvement of heat removal over U.S. Pat. No. 3,633,054 that teaches an intermediary cooled metal channel. The present invention requires no additional build components so minimising cost and volume of motors and significantly improves heat removal whilst avoiding eddy current losses.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced actuator or system or device as may be desirable. In addition, any reference to "comprising" or "consisting" is not intended to be limiting in any way whatsoever and the reader should interpret the description and claims accordingly. Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims.

The invention claimed is:

1. An axial flux motor comprising:
   one or more rotating disks;
   a stator, having a cavity formed between walls and containing therein more than one electro-magnetic coil assemblies comprising more than one pole pieces each having an axially extending shank portion;
   first and second radially extending end shoes at ends of said one or more shank portions; and
   one or more coils each wound around a shank portion, wherein:
   said end shoes include one or more outer surfaces one or more of which are joined to one or other of said walls;
   one or both of said first or second shoes further comprise a heat exchange surface facing the coil such as to define one or more first cooling channels between one or both of said heat exchange surface and said coil; and
   the motor further includes:
      a second cooling channel defined by the spacing of adjacent coils, the second cooling channel being in fluid communication with the one or more first cooling channels, and
      a liquid coolant for flowing within the first and second cooling channels, wherein heat from the coils and heat exchange surfaces of the shoes is transferred to the liquid coolant and away from the coils and heat exchange surfaces.

2. The axial flux motor as claimed in claim 1, wherein each of said heat exchange surfaces are spaced from said coil such as to define said first cooling channels between each heat exchange surface and said coil.

3. The axial flux motor as claimed in claim 1, wherein said coils are spaced from one or more of said heat exchange surface by a spacer.

4. The axial flux motor as claimed in claim 1 wherein each of said coils comprises a tapered coil as viewed from a cross section of the stator through a plane that extends in an axial direction through the shoes and the shank portion around which the respective coil is wound, wherein, as viewed through the cross sectional plane, the tapered coil has a base adjacent the shank portion that is wider than a outward surface of the tapered coil that is spaced apart from the base and the shank portion and wherein said base extends along a greater length of said shank portion than said outward surface such as to define a tapered cooling channel with each of the end shoes.

5. The axial flux motor as claimed in claim 3, wherein said spacer comprises a protrusion on said shank portion that is axially disposed between at least one end shoe and the coil.

6. The axial flux motor as claimed in claim 1 and further including one or more turbulence generators within the one or more cooling channels.

7. The axial flux machine as claimed in claim 6, wherein said one or more turbulence generators comprise detents on one or more of said one or more heat exchange surfaces.

8. The axial flux machine as claimed in claim 1 and further including a bobbin and wherein said coil is mounted upon and around said bobbin.

9. The axial flux machine as claimed in claim 8 and wherein said bobbin includes one or more spacers to space said coil from one or other or both of the heat exchange surfaces.

10. The axial flux machine as claimed in claim 8 and wherein said bobbin further includes one or more further spacers to space the coil from the bobbin itself and defining one or more inner cooling paths between the bobbin and the end face or faces of the coil.

11. The axial flux motor as claimed in claim 8 and wherein said bobbin is electrically insulating.

12. The axial flux motor as claimed in claim 8 wherein said bobbin includes an interior shaped to fit around the pole piece.

13. The axial flux motor as claimed in claim 1 and further including a liquid coolant supply means for directing the liquid coolant into said one or more cooling channels.

* * * * *